United States Patent [19]

Sawanobori

[11] Patent Number: 5,675,747
[45] Date of Patent: Oct. 7, 1997

[54] DATA TRANSMISSION SYSTEM WITH ERRONEOUS CONNECTION INDICATOR

[75] Inventor: Keiji Sawanobori, Tokyo, Japan

[73] Assignee: Asahi Kogaku Kogyo Kabushiki Kaisha, Tokyo, Japan

[21] Appl. No.: 699,691

[22] Filed: Aug. 15, 1996

Related U.S. Application Data

[63] Continuation of Ser. No. 433,571, May 3, 1992, abandoned.

[30] Foreign Application Priority Data

May 17, 1994 [JP] Japan ................................ 6-126797

[51] Int. Cl.⁶ .................................................. G06F 13/00
[52] U.S. Cl. ...................... 395/280; 395/309; 395/311
[58] Field of Search ................................. 395/280, 309, 395/311

[56] References Cited

U.S. PATENT DOCUMENTS

| | | | |
|---|---|---|---|
| 4,628,303 | 12/1986 | Boyle | 340/661 |
| 5,121,342 | 6/1992 | Szymborski et al. | 364/514 |
| 5,179,269 | 1/1993 | Horie et al. | |
| 5,241,595 | 8/1993 | Kuno | 380/18 |
| 5,260,612 | 11/1993 | Lehmann et al. | 307/475 |

Primary Examiner—Jack B. Harvey
Assistant Examiner—John Travis
Attorney, Agent, or Firm—Greenblum & Bernstein, P.L.C.

[57] ABSTRACT

A data transmission system connects a first device and a second devices, and transmits a signal therebetween. The data transmission system includes a first interface for interfacing the first device and the second device, and a second interface for interfacing the first device and the second device. The first device outputs the signal, with the signal having one of a plurality of voltage ranges. A selector selects one of the first interface and the second interface. The data transmission system also includes an indicator for indicating whether the voltage range of the signal output from the first device is out of a predetermined voltage range of the selected one interface, when the selector selects the one interface.

17 Claims, 2 Drawing Sheets

DATA TRANSMISSION SYSTEM WITH ERRONEOUS CONNECTION INDICATOR

This application is a continuation, of application Ser. No. 08/433,571, filed May 3, 1995, now abandoned.

BACKGROUND OF THE INVENTION

The present invention relates to a data transmission system having a main device, such as a computer, connected to a plurality of peripheral devices which may transmit different types of signals to the main device.

Conventionally, peripheral devices which transmit data to a main computer employ one of more signal transmitting standards. For instance, bar code readers which are connected to a host computer may output a TTL signal or an RS-232C signal. If the bar code reader outputs a TTL signal, then a +5 V signal corresponds to a logical HIGH, and a 0 V signal corresponds to a logical LOW. However, if the bar code reader outputs an RS-232C signal, then a −10 V signal corresponds to a logical HIGH, and a +10 V signal corresponds to a logical LOW.

Accordingly, if a peripheral device, such as the bar code reader, which outputs one type of signal is attached to an interface of the host computer which is designed to accept another type of signal, erroneous operation of the data transmission system will occur. Further, since the RS-232C signal has a wider operating voltage range than the TTL signal, if a peripheral device which outputs an RS-232C signal is attached to a TTL interface of the host computer for a certain period of time, damage to the TTL interface may occur.

SUMMARY OF THE INVENTION

It is therefore an object of the present invention to provide an improved data transmission system which indicates to a user of the data transmission system a condition that a device having a predetermined operating voltage range is connected to an interface having an operating voltage range which is narrower than the predetermined operating voltage range.

It is another object of the present invention to provide an improved data transmission system in which an indicator indicates an erroneous connection of a device to the interface, as well as information related to data transmitted from the device to the interface.

According to an aspect of the present invention, there is provided a data transmission system for connecting a first device with a second device, a signal being exchanged between the first device and the second device. The data transmission system includes:

a first interface for interfacing the first device with the second device. The first device outputs the signal which may include one of a plurality of voltage ranges. The data transmission system also includes a second interface for interfacing the first device with the second device, a selector switch for selecting one of the first interface and the second interface, and an indicator for indicating whether the voltage range of the signal received from the first device is out of a predetermined voltage range of the selected one interface, when the selector switch selects the one interface.

Optionally, the first device includes a peripheral device and the second device includes a host computer. The host computer receives data from the peripheral device through the data transmission system.

Further, the indicator may also be used for indicating an erroneous operating condition of the first device in accordance with the data transmitted from the first device to the second device.

Further optionally, the first device may output either, e.g., an RS-232C signal or a TTL signal, with the first and the second interfaces interfacing the TTL and the RS-232C signals, respectively. However, the types of interfaces are not limited to TTL and RS-232C.

Optionally, the indicator can be actuated with power only from the received signal if the first interface receives the signal having a voltage which is out of the predetermined voltage range. Therefore, the data transmission system can indicate that the first device is connected to an incorrect interface, even if the second device is not operable. This provides additional protection in the case that the first device is incorrectly connected.

Further optionally, the data transmission system further includes a device for receiving an error signal from the second device, the receiving a device driving the indicator when the error signal is received. The receiving device may include a switching circuit, which drives the indicator when the error signal is received.

Furthermore, the second device includes a processor for processing the signal transmitted from the first device. The processor outputs the error signal when an error condition is detected during the processing of the signal.

Still optionally, the indicator may include, e.g., an LED or other light emitting device which emits light when voltage is applied. Further, the light emitting device may be connected in series to rectifiers so that the light emitting device emits (or does not emit) light depending on the polarity of voltage of the signal transmitted from the first device to the first interface. Furthermore, any other indicator (e.g., visual or aural) may alternatively be used.

According to another aspect of the present invention, there is provided a data transmission system for connecting a first device to a second device. The data transmission system includes at least two interfaces selectively connected to the first device for receiving a signal from the first device and an indicator capable of being actuated to indicate an erroneous operating condition of the first device. The erroneous operating condition is included in the signal. When one of the at least two interfaces receives a signal having a voltage range wider than a range to be applied to one of the at least two interfaces, the indicator is actuated.

Optionally, when the one of the at least two interfaces receives the signal having a negative voltage value, the indicator is actuated, and when the one of the at least two interfaces receives the signal having a positive voltage value, the indicator is not actuated.

wherein when one of the two interfaces receives a signal having voltage range wider than a range to be applied to the one of the two interfaces, the indicator is actuated.

Optionally, when the one of the two interfaces receives the signal having a negative voltage value, the indicator is actuated, and wherein when the one of the two interfaces receives the signal having a positive voltage value, the indicator is not actuated.

According to a further aspect of the present invention, there is provided a data transmission system for connecting a peripheral device to a host computer. The data transmission device including at least two interfaces for receiving a signal from the peripheral device, each of the interfaces selectable by a switch, and an indicator for indicating information contained within the signal. When the switch selects one of the at least two interfaces, the indicator indicates information related to a voltage of the signal received from the peripheral device. When the switch selects either of the at least two interfaces the indicator also indicates information related to data transmitted by the signal.

DETAILED DESCRIPTION OF THE EMBODIMENTS

Figure 1:
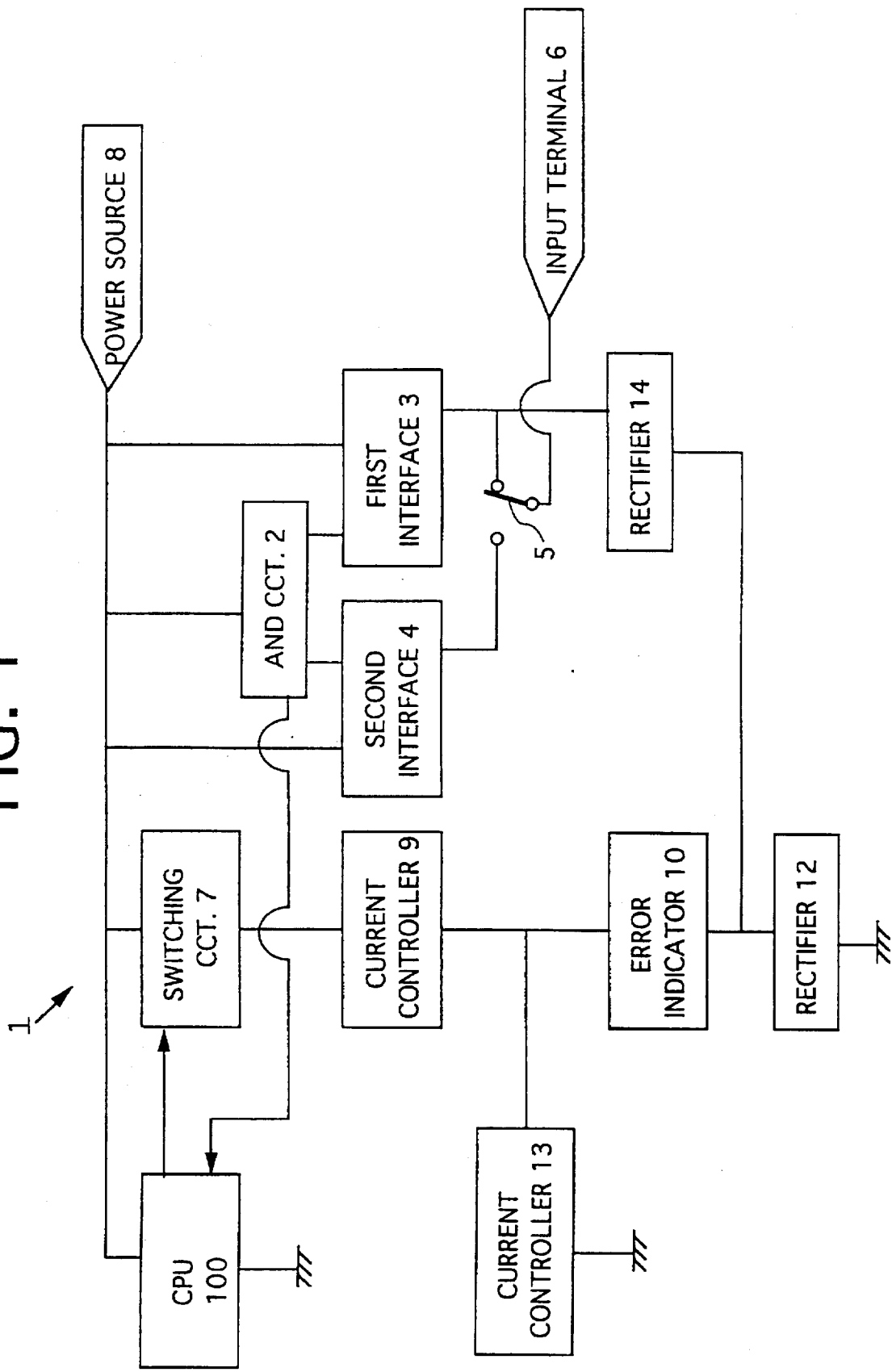
FIG. 1 is a block diagram of a data transmission system embodying the present invention.

FIG. 1 is a block diagram of a data transmission system 1, embodying the present invention.

Data transmission system 1 includes a host computer having a CPU 100. Data transmission system 1 has a power source 8, and an input terminal 6. A peripheral device (not shown) is attached to the input terminal 6 and connected, via switch 5, to a first interface 3 or a second interface 4. The first interface 3 is provided to communicate with peripheral devices which output a TTL signal, while the second interface 4 is provided to communicate with peripheral devices which output, e.g., e.g., an RS-232C signal. The TTL signal has two values: a +5 V signal which corresponds to a logical HIGH, and a 0 V signal which corresponds to a logical LOW. Similarly, the RS-232C signal has two values: a −10 V signal which corresponds to a logical HIGH, and a +10 V signal which corresponds to a logical LOW.

An output of the first interface 3 and an output of the second interface 4 are connected to inputs of an AND gate 2. In the preferred embodiment, the first interface 3 and the second interface 4 are active LOW. Therefore, when one of the interfaces (3,4) is selected, the output of the other interface (3,4) remains HIGH. Thus, the data output by the AND gate 2 will be the same as the data output from the selected interface (3,4), since the other input to the AND gate 2 remains HIGH. The output of the AND gate 2 is then fed to CPU 100.

The CPU 100 drives a switching circuit 7 to control an operation of an error indicator 10. When the switching circuit 7 is controlled to turn ON the error indicator 10, current flows from the power source 8 through the switching circuit 7 to the error indicator 10. The current flow is controlled by a current controller 9 and a current controller 13. A voltage across the error indicator 10 is controlled by rectifier 12.

Further, rectifier 14 provides proper biasing, such that when a peripheral device which outputs an RS-232C signal inadvertently connected to the first interface 3 by the switch 5, the error indicator 10 is biased to turn ON. The signal output from the peripheral device to the input terminal 6 can be detected, and the error indicator 10 turned ON to indicate an incorrect connection, by using power provided by the signal output from the peripheral device. Thus, the error indicator 10 will be turned ON even if no power is provided from the power source 8. It is therefore not necessary to use the power source 8 in order to indicate a connection of a peripheral device to an incorrect interface.

As also described above, the CPU 100 can drive the switching system 7 and thereby control the error indicator 10. Thus, if there is a data error from the peripheral device which is detected by the CPU 100, this error can be indicated. Therefore, according to the preferred embodiment, more than one type of error can be indicated by a single error indicator.

Figure 2:
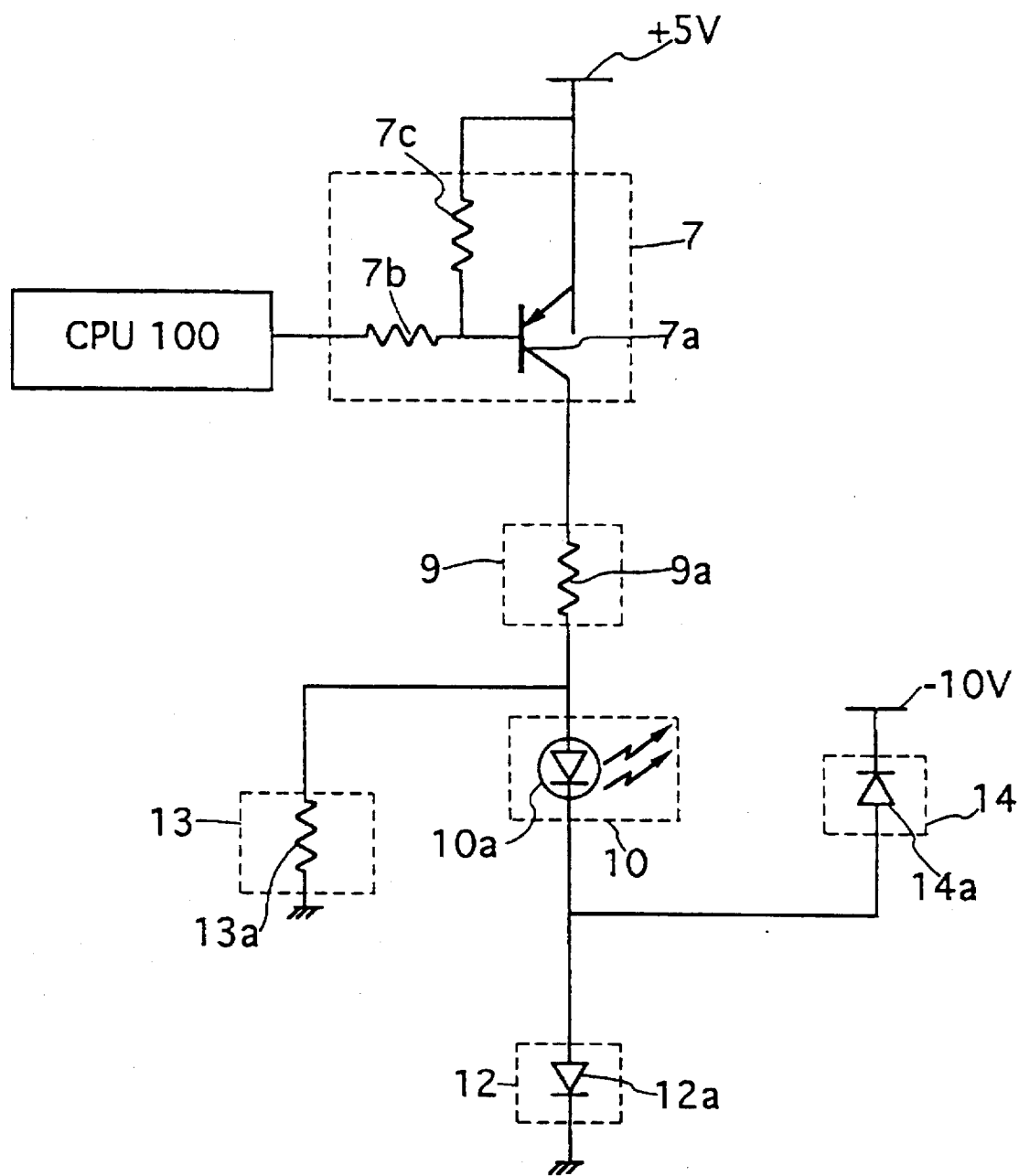
FIG. 2 is a schematic diagram of a portion of the data transmission system shown in FIG. 1.

FIG. 2 shows a schematic diagram of a portion of the data transmission system 1. As shown in FIG. 2, the switching system 7 comprises transistor 7a, resistor 7b and resistor 7c. The current controller 9 comprises resistor 9a, while the current controller 13 comprises resistor 13a. The error indicator 10 comprises LED 10a, while the rectifiers 12 and 14 comprise diodes 12a and 14a, respectively.

An operation of the above described data transmission system will be described below.

Initially, a peripheral device (not shown) is connected to the data transmission system 1 through the input terminal 6. If the signal output from the peripheral device is an RS-232C signal, and the switch 5 is positioned to connect the input terminal to the first interface 3, as shown in FIG. 1, the input terminal 6 is also connected to rectifier 14. As shown in FIG. 2, the anode of the diode 14a is biased at −10 V when a peripheral device outputs an RS-232C signal while connected to rectifier 14. This results in the LED 10a being forward biased and diodes 12a and 14a also being forward biased. Thus, the LED 10a emits light, indicating that an error has occurred. Since the erroneous connection is indicated, an operator can disable or switch the connection so that the signal (having a wider operating range than the first interface 3) is not continuously applied to the first interface 3. Therefore, no damage to the first interface 3 will occur.

If a peripheral device which outputs a TTL signal is connected to the input terminal 6, and the switch 5 is connected to the first interface 3, the voltage at the anode of the diode 14a is +5 V. The diode 14a is reversed biased, and, therefore, no current flows through the LED 10a, and light is emitted. Therefore, no error is indicated.

In case switch 5 is set to connect the input terminal 6 to the second interface 4, the rectifier 14 is not connected to the input terminal 6, and therefore, no error indication is made. The operating voltage range of the second interface 4 is designed, e.g., for an RS-232C signal, and as a result, if a peripheral device which outputs a TTL signal is erroneously connected to the second interface, no damage to the interface will occur.

As described above, the embodiment according to the present invention provides a visual indication of an erroneously connected peripheral device, which may damage the data transmission system if connected to the CPU 100. Thus, according to the present invention, damage of the data transmission system can be avoided.

In the disclosed embodiment, the first interface 3 is designed to receive TTL signals. Thus, depending on the design of the first interface 3, the first interface 3 may be damaged if RS-232C signals are applied, since the operating voltage range of the RS-232C signals is wider than the operating voltage of the first interface 3. Therefore, a protection circuit such as a clamping circuit, can be provided at the first stage of the first interface 3 in order to prevent the first interface 3 from being damaged.

Once it is determined that the peripheral device connected to the input terminal 6 is connected to the correct interface, then the error indicator 10 may be used to indicate erroneous data transmission from the peripheral device.

As shown in FIGS. 1 and 2, the output from the first interface 3 and second interface 4 is fed to the AND gate 2. The output of the AND gate 2 is fed to an input of the CPU 100. If the CPU 100 determines that the data output from the AND gate 2 is erroneous, the CPU 100 drives the switching circuit 7 to turn ON transistor 7a. The LED 10a is therefore forward biased, and emits light, indicating that an error has occurred.

Therefore, as described above, a single error indicator 10 (LED 10a) can be used to provide information about an erroneously connected peripheral device, as well as an error in data received from the peripheral device. This improves the functionality of the data transmission system. Further, the number of parts, cost and size of the data transmission system are reduced by this implementation.

Further, as described above, an indication of an erroneously connected peripheral device can be made even though the host computer is not connected, and an external power supply is not turned ON. This can prevent damage to the host computer, since the error can be corrected before the peripheral device is patched to the host computer.

The present disclosure relates to subject matter contained in Japanese Patent Application No. HEI 6-126797 filed on May 17, 1994 which is expressly incorporated herein by reference in its entirety.

What is claimed is:

1. A data transmission system for connecting a first device and a second device, a signal, having an operating voltage range selected from a first operating voltage range and a second operating voltage range, being exchanged between said first device and said second device, said data transmission system comprising:

a first interface that interfaces said signal between said first device and said second device at said first operating voltage range;

a second interface that interfaces said signal between said first device and said second device at said second operating voltage range;

a signal transfer terminal that connects said first device with said second device for exchanging said signal between said first device and said second device;

a selector that connects said signal transfer terminal to one of said first interface and said second interface;

an indicator that indicates an error condition to a user of the data transmission system; and a switcher that activates said indicator using said signal exchanged between said first device and said second device, when said signal is exchanged at said second operating voltage range and said selector connects said signal transfer terminal to said first interface, wherein a voltage range of said first operating voltage range differs from a voltage range of said second operating voltage range.

2. The data transmission system of claim 1, wherein said selector connects said signal transfer terminal to said first interface when said first device outputs a TTL signal, said selector connecting said signal transfer terminal to said second interface when said first device outputs a RS-232C signal.

3. The data transmission system of claim 1, wherein said indicator comprises an LED.

4. The data transmission system of claim 1, wherein said first interface comprises a TTL interface and said second interface comprises an RS-232 interface, said indicator indicating that said first device is configured as said RS-232 interface when said selector connects said signal transfer terminal to said TTL interface.

5. The data transmission system of claim 1, wherein said switcher comprises a rectifying device that is serially connected to said indicator, said rectifying device passing an electrical current when said rectifying device is forward biased.

6. The data transmission system of claim 5, wherein said second device comprises a controller that activates said indicator when a data processing error occurs.

7. The data transmission system of claim 6, wherein said controller activates said indicator without forward biasing said rectifying device.

8. The data transmission system of claim 6, wherein said indicator is activated when said rectifying device is forward biased, regardless of whether said controller activates said indicator.

9. The data transmission system of claim 5, wherein said rectifying device is forward biased when a voltage level of said signal in said second operating voltage range, corresponds a logical HIGH state.

10. The data transmission system of claim 9, wherein said rectifying device is reverse biased when a voltage level of said signal in said first operating voltage range, applied to said first interface, corresponds to a logical HIGH state.

11. A data transmission system for connecting a first device and a second device, said data transmission system comprising:

at least two physically distinct interfaces selectively connected to said first device for receiving a signal from said first device;

a signal transfer terminal that connects said first device to said second device for exchanging said signal between said first device and said second device;

a selector that connects said signal transfer terminal to one of said at least two physically distinct interfaces; and an indicator that indicates, to a user of the data transmission system, an erroneous operating condition of said first device, said erroneous operating condition being included in said signal received from said first device, said indicator being actuated when one of said at least two physically distinct interfaces receives a signal having a voltage range greater than a predetermined range.

12. The data transmission system according to claim 11, said indicator being provided with power only from said received signal when one of said at least two interfaces is selected.

13. The data transmission system according to claim 11, said indicator comprising an LED.

14. The data transmission system according to claim 11, wherein said indicator is not actuated when said one of said at least two interfaces receives said signal having a positive voltage value, said indicator being actuated when said one of said at least two interfaces receives said signal has a negative voltage value.

15. A data transmission system for connecting a first device and a second device, said first device outputting a signal that is inputted to said second device, said data transmission system comprising:

a first interface that interfaces said signal between said first device and said second device at a first voltage operating range;

a second interface, distinct from said first interface, that interfaces said first device to said second device at a second voltage operating range, said second voltage operating range differing from said first voltage operating range;

a signal transfer terminal that connects said first device with said second device for transmitting said signal from said first device to said second device, said signal having a predetermined voltage operating range selected from said first voltage operating range and said second voltage operating range;

means for connecting said signal transfer terminal to one of said first interface and said second interface; and an indicator that is activated to provide an indication to a user of the data transmission system when said predetermined voltage range of said signal output by said first device exceeds a predetermined input voltage operating range of said second device, said indicator indicating the existence of a voltage mismatch between said first device and said second device.

16. The data transmission system of claim 15, wherein said first voltage operating range comprises a voltage range of a TTL signal and said second voltage operating range comprises a voltage range of a RS-232 signal.

17. The data transmission system of claim 16, said indicator being activated when said predetermined voltage operating range of said signal input by said first device comprises said RS-232 signal while said predetermined input voltage operating range of said second device is configured for said TTL signal.

* * * * *

UNITED STATES PATENT AND TRADEMARK OFFICE
CERTIFICATE OF CORRECTION

PATENT NO. : 5,675,747
DATED : October 7, 1997
INVENTOR(S) : K. Sawanobori

It is certified that error appears in the above-indentified patent and that said Letters Patent is hereby corrected as shown below:

Title page, item [63], Related U.S. Application Data, change "May 3, 1992" to --May 3, 1995--.

Signed and Sealed this

Twenty-eighth Day of July, 1998

Attest:

BRUCE LEHMAN

Attesting Officer

Commissioner of Patents and Trademarks